R. W. BURNETT.
JOURNAL BOX.
APPLICATION FILED MAR. 13, 1913.
1,194,475.
Patented Aug. 15, 1916.
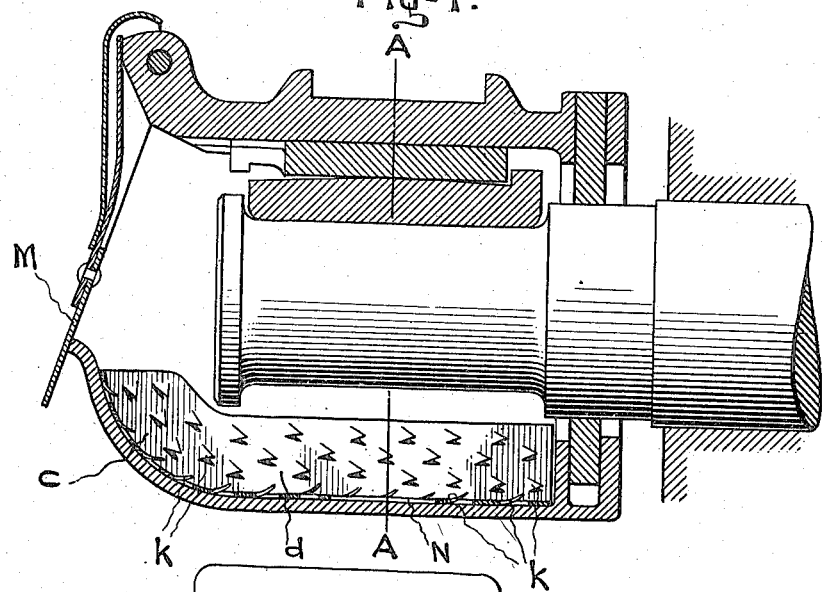
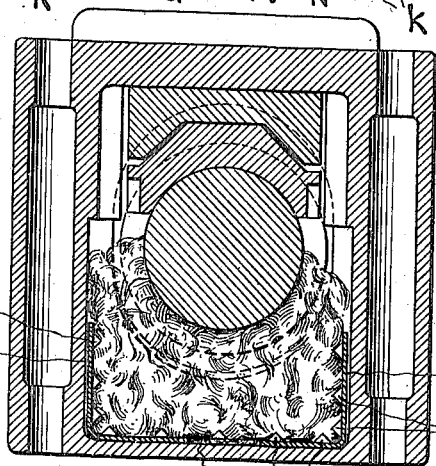
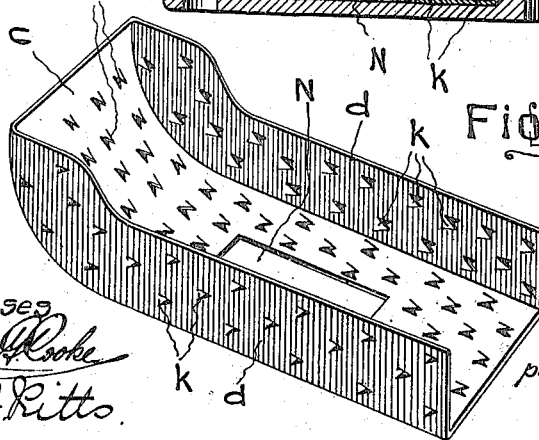
Richard W. Burnett.
Inventor.

UNITED STATES PATENT OFFICE.

RICHARD WEBB BURNETT, OF MONTREAL, QUEBEC, CANADA.

JOURNAL-BOX.

1,194,475. Specification of Letters Patent. Patented Aug. 15, 1916.

Application filed March 13, 1913. Serial No. 754,135.

*To all whom it may concern:*

Be it known that I, RICHARD WEBB BURNETT, of the city of Montreal, Province of Quebec, Dominion of Canada, a citizen of the United States of America, have invented certain new and useful Improvements in Journal-Boxes; and I do hereby declare that the following is a full, clear, and exact description thereof.

The object of my invention is to prevent the waste or packing in journal boxes from creeping toward the lid or outer end thereof.

Railway car journal boxes are partially filled with waste or other material saturated with oil to act as a lubricant carrier and sufficient of this saturated material is packed into each box to fill the lower part thereof from front to back and of a depth to extend from the bottom of the box to the journal which it partly surrounds. The resiliency of the packing causes it when freshly packed to press against the underside of the journal and feed the lubricant thereto, thus lubricating it throughout its entire length. The tendency is however for the lubricant carrier to be shifted by the constant vertical and horizontal vibration of the box, owing to the unavoidable jolting and longitudinal movement thereof while the train is in motion, thus causing the waste or other lubricant carrier to settle below and out of contact with the journal and work toward the front of the box, leaving the inner portion of the journal unlubricated, the consequence being that the great friction on this unlubricated portion of the journal causes it to become heated.

Hot journals are a great source of danger to life and frequent cause of loss of property and delay to traffic, the journals themselves being sometimes weakened in this manner and breaking off or the brasses are destroyed, causing wrecks or requiring the renewal of the journal bearings before their time. These defects are obviated according to my invention by a sheet metal dish of channel cross-section which closely fits the lower portion of the interior of the box and is provided with integral devices preventing movement of the saturated material in the direction of the opening through which it is charged and at the same time offering no obstruction to the charging. The bottom of the member has an opening. For full comprehension, however, of my invention reference must be had to the accompanying drawings forming a part of this specification in which similar reference characters indicate the same parts, and wherein:

Figure 1 is a longitudinal vertical sectional view of a journal box provided with my invention; Fig. 2 is a transverse vertical sectional view taken on line A A Fig. 1; Fig. 3 is a detail perspective view of my improved member for preventing outward movement of the lubricant carrier without obstructing the charging of the box. I term this member an anti-creeper for waste or the like. It is pressed or otherwise formed from a single sheet of metal and comprises a bottom one end of which is curved upwardly as at $c$, the sides of the sheet being bent upwardly at right angles to the bottom to form sides $d$. The shape of this anti-creeper and the width and length thereof are in close conformity with the lower portions of the interior of the M. C. B. journal boxes, and the height of the upwardly curved end C is preferably slightly above the level of the bottom of the journal, the sides $d$ being slightly less than the height of the latter.

The entire surface of the anti-creeper is formed with a multiplicity of integral teeth or barbs $k$ struck up therefrom and disposed to have their points project away from the lid M which is located at what I term the front of the journal box, such teeth or barbs being pointed and inclined at an acute angle to the surface from which they are struck.

The middle of the bottom of the anti-creeper is cut away as at N to expose the bottom of the journal box and afford communication through which the waste reaches the oil precipitated from the saturated body and by capillary attraction returns it again to the journal. Another function of this opening is to afford the necessary clearance for the collar of the journal when the anti-creeper is being set in place or removed.

The particular form and arrangement of the teeth or barbs afford absolutely no obstruction to packing, and the horizontal vibration of the box performs an actual feeding action toward the inner or rear end of the box, thus effectively neutralizing any tendency of the waste or other lubricant carrier to creep into the space between the end of the journal and the lid of the box which has generally happened with journal boxes heretofore. By preventing this creeping, hot boxes and the consequent danger of accidents and damage to property above mentioned, are obviated.

What I claim is as follows:—

1. The combination with a journal box; of an anti-creeping device for the lubricant carrier consisting of a unitary sheet-metal member of substantially U-cross-section presenting a uniformly flat bottom conforming to and in contact with the bottom of the interior of the journal box and a plurality of inwardly projecting barbs struck out of said member for the purpose of preventing axial displacement of the lubricant carrier outwardly relatively to the journal.

2. The combination with a journal box; of an anti-creeping device for the lubricant carrier consisting of a unitary sheet-metal member of substantially U-cross-section presenting a uniformly flat bottom conforming to and in contact with the bottom of the interior of the journal box and a plurality of series of inwardly projecting barbs, struck out of said member for the purpose of preventing axial displacement of the lubricant carrier outwardly relatively to the journal, the barbs of one series being in staggered relation with the barbs of the adjoining series.

In testimony whereof I have signed my name to this specification in the presence of two witnesses.

RICHARD WEBB BURNETT.

Witnesses:
E. R. PITTS,
WILLIAM J. C. HEWETSON.

Copies of this patent may be obtained for five cents each, by addressing the "Commissioner of Patents, Washington, D. C."